I. J. SMITH.
OVERHEAD WASHER.
APPLICATION FILED JAN. 21, 1909.
980,353.
Patented Jan. 3, 1911.
2 SHEETS—SHEET 2.
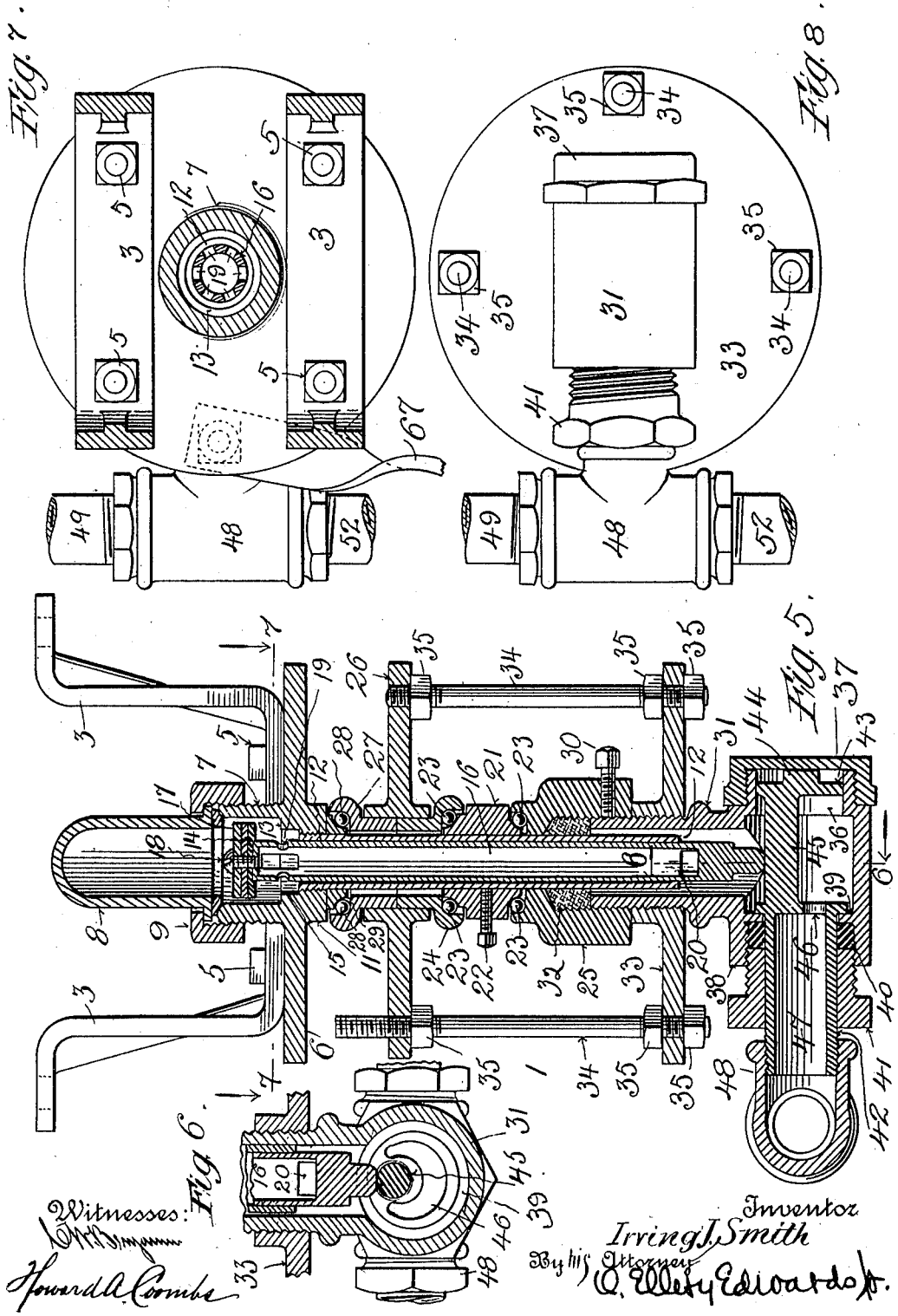

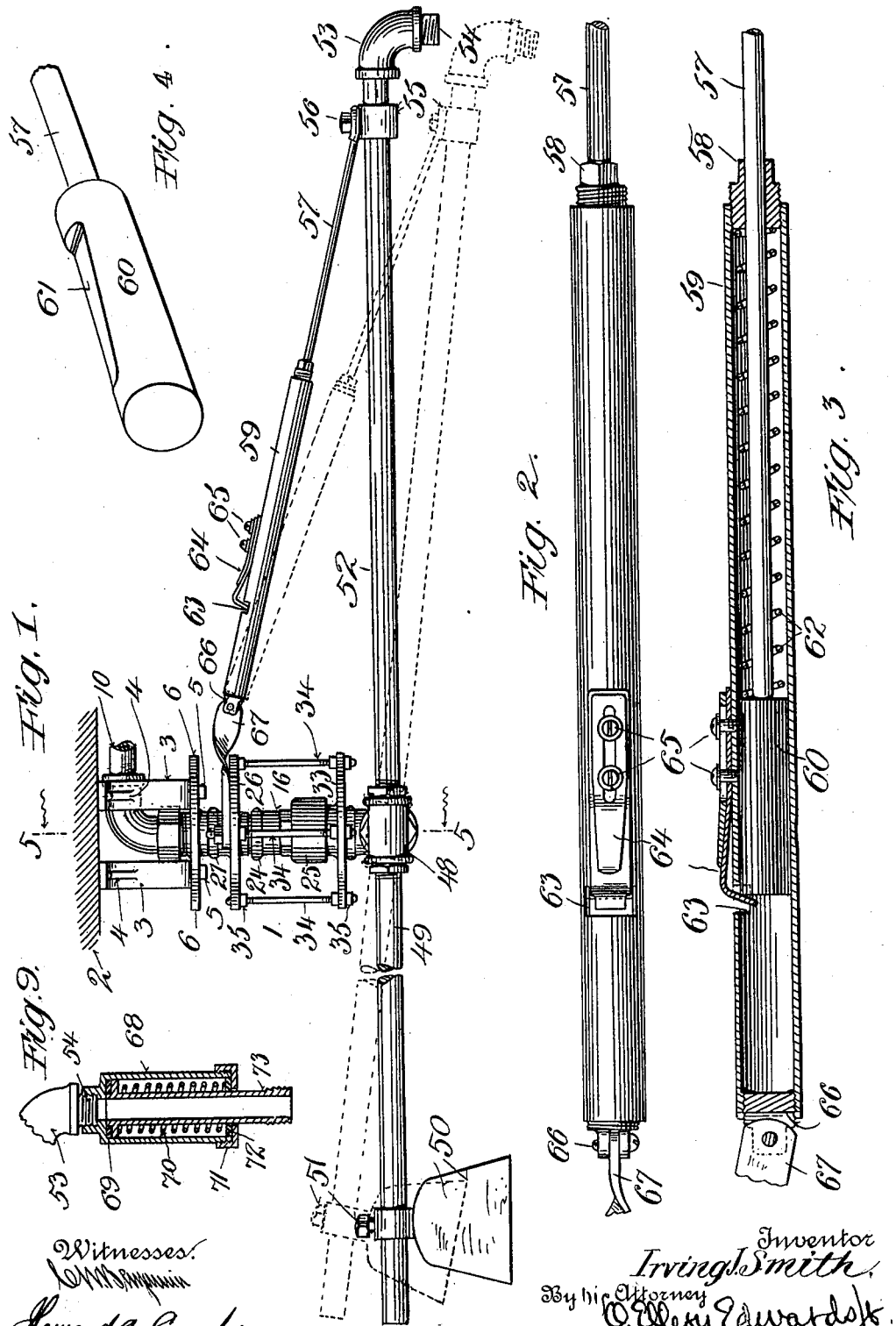

UNITED STATES PATENT OFFICE.

IRVING J. SMITH, OF NEW YORK, N. Y., ASSIGNOR TO I. J. SMITH MFG. CO., A CORPORATION OF NEW YORK.

OVERHEAD WASHER.

980,353.  Specification of Letters Patent.  Patented Jan. 3, 1911.

Application filed January 21, 1909. Serial No. 473,475.

*To all whom it may concern:*

Be it known that I, IRVING J. SMITH, a citizen of the United States, and a resident of the city, county, and State of New York, have invented a new and useful Improvement in Overhead Washers, of which the following is a specification.

The object of my invention is to provide a device of this class which will permit the water to be turned on by pulling the hose secured thereto and shut off by a further pull when it is desired that the flow should cease.

A further object is to provide a washer with a pipe so mounted that it will swing about both a horizontal and vertical axis while in use and follow the movements of the person washing a vehicle.

A further object is to provide a device in which all undue stress and strains are prevented from reaching any joints or other parts which might become leaky while the washer is in use.

A further object is to automatically shut off or turn on the water prior to its reaching any joints of the washer with relatively movable parts so that all leakage at the said joints is impossible when the washer is not in use and the strains are eliminated on the said joints when the water is shut off.

These and other objects are all accomplished by my invention, one embodiment of which is set forth below.

For a more particular description of my invention reference is to be had to the accompanying drawings forming a part hereof in which—

Figure 1 is a side elevation of my improved washer. Fig. 2 is a detailed view showing a portion of the casing for holding a spring and parts coöperating therewith. Fig. 3 is a longitudinal section of the structure shown in Fig. 2. Fig. 4 is a perspective view of a portion of the plunger shown in Fig. 3. Fig. 5 is a sectional view taken on the line 5—5 of Fig. 1, looking in the direction of the arrows. Fig. 6, is a sectional view taken on the line 6—6 of Fig. 5, looking in the direction of the arrows. Fig. 7 is a sectional view, taken on the line 7—7 of Fig. 5, looking in the direction of the arrows. Fig. 8 is a bottom plan view of portion of my improved washer. Fig. 9 is a detailed view showing an elastic connection between a rubber hose and the pipe of the washer.

Throughout the various views of the drawings similar reference characters designate similar parts.

My improved washer is best shown in the form embodied in my copending application, Serial Number 400,757, to which certain features are added and some features are changed. The changes relate to suitable valve mechanism for cutting off the supply of water, and to substituting for the pipe fixedly connected to the bottom disk, a pipe which is pivotedly carried by the bottom disk and to other mechanism incidental thereto for operating the valve and for holding the distributing pipe either so as to keep the water turned on, or keep the water turned off, as desired. In this application, as in my said co-pending application, my improved washer 1 is secured to a ceiling 2, by means of suitable brackets 3, in any suitable manner, as by bolts 4 and these brackets 3 are secured by bolts 5 to the top disk 6. However, the disk 6 differs from that shown in my said application as it is provided with a central and upwardly extending collar 7 which is connected to an elbow 8 by means of a suitable union 9, made in the conventional manner. The elbow connects with a pipe 10 which runs to any suitable source of water supply. The disk 6 is also provided with a downwardly extending collar 11, concentric with the disk, and screw threaded to receive a pipe 12 which extends downwardly therefrom as will appear below.

The part of the disk 6 within the boss 7 and adjacent to the upper end of the pipe 12 is formed with a seat 13, for the valve packing 14; the seat 13, the packing 14, and the parts connected therewith form a valve 15 with a stem 16 to which the packing 14 is secured by means of the washer 17 and a screw 18. The valve stem 16 is hollow and slides freely in the pipe 12 and is closed at each end and at its top is provided near the packing 14 with openings through which water passes when the washer is in use. Near the lower end of the stem 16 are openings 20, for a similar purpose. It will be observed that the disk 6 and its seat 13 are in fixed relation to the pipe 10 and have no joints with parts which are relatively movable when the washer is in use, the elbow 8 being fixed. For this reason these parts can be considered a part of the pipe 10, if so desired. It is also obvious that the water is shut off or turned on prior to reaching any joint in the washer with relatively movable parts.

The stud pipe 12 is provided with a collar 21 which is fixed in place on said pipe 12 by means of a set screw 22. The ends of the collar 21 are provided with suitable cones for balls 23 which run in suitable cups 24 and 25. The cup 24 is fixed in a disk 26 which is preferably about the same size as the disk 6 and this disk 26 carries a second cup 27 which contains balls 28 which run on a cone 29 which rests against the boss 11 on the disk 6. The cup 25 has a set screw 30 which fixes it to a T 31, as shown in Fig. 5, and this cup 25 is sufficiently enlarged and screw threaded in its interior so as to fit corresponding screw threads on the T 31. A packing 32 is held by the cup 25 and T 31 snug against the stud pipe 12 which terminates in said T. By loosening the said screw 30 and turning the T 31, the wear on the packing 32 may be taken up from time to time, as desired whereby all leakage is prevented. The cup 25 also abuts against a disk 33 which is threaded on the T 31, as shown, and held parallel to the disks 26 and 33 are held in fixed and parallel relation by means of tie bolts 34 and nuts 35, the disks 26 and 33 being given suitable perforations so as to permit the bolts 34 to be used as shown. The disks 33, 26 and 6, together with the cups, cones, bolts and balls are substantially the same as those shown in my said application, or if desired, they may be changed or omitted, as is obvious.

The T 31 has one of its shorter arms 36 covered by a suitable cap 37 and its other arm, 38, is provided with a suitable shoulder 39 in its interior against which abuts a packing 40 which is compressed by the usual bushing 41, in the conventional manner. The collar 39 and the arm 36 as well as the arm 38 all have the same axis and the casting, which may be called a crank pipe, 42 revolves therein. This crank pipe 42 has a disk 43 which fits snug and turns freely in said arm 36. The disk 43 has a concentric boss 44 that is adapted to rub against the cap 37 and also an eccentric arm 45 which joins it to a second and perforated disk 46 that is adapted to rub against the collar 39 when the pipe crank is turned. The disk 46 is preferably formed integral with the stud-pipe 47 to which a T is secured in the conventional manner, as shown. The function of the eccentric arm 45, which might be termed a crank, is to raise the valve stem 16, the lower end of which rests on said arm 45 so that when the pipe-crank 42 is turned, it must necessarily raise or lower the stem 16 and open or permit the closing of the valve 15. It is not necessary that it close the valve 15 because the water pressure is sufficient to do that whenever the pipe crank 42 permits.

The water which issues through the perforations 20 in the stem 16 surrounds the lower end of this stem and the arm 45 and then passes through the perforation in the disk 46 which permits a free flow of water through the pipe 47 and into the T 48. The T 48 has two pipes extending therefrom in opposite directions. One pipe 49 is plugged and may be a bar of iron if desired, and carries a counterbalance 50 adjustably mounted thereon and fixed in place by a set screw 51, in any desired position. The other pipe 52 which is a distributing pipe and is preferably about twice as long as the pipe 49, runs to an elbow 53 which is provided with the connection 54 to which a rubber hose may be secured in the conventional manner or otherwise, as described below.

The counterbalance 50 is so placed as to balance the weight of the hose and the pipe 52 together with any other parts which may be carried by said pipe such as described in my said application.

It is obvious that the device as above described has nothing for positively holding the distributing pipe 52 either in a position when it shuts off the water or in a position when it permits the water to flow through the pipe 52. Means for accomplishing this result is as follows: Near the elbow 53 is a sleeve 55 with a cap screw 56 which holds an eye bar 57, one end of which passes through a plug 58 and is secured as shown. The rod 57 is provided with an enlarged end or plunger 60 recessed at 61 substantially as shown in Fig. 4. A coiled spring 62 which acts in compression is placed on the rod 57 and in the pipe 59 between the plug 58 and the plunger 60. The pipe is provided with a suitable perforation 63 through which extends a suitable leaf spring 64 held by means of suitable screws 65. The pipe 59 has a plug 66 at its other end which is pivotally connected with a twisted link 67 that is secured by a nut 35 on a bolt 34 as shown. In the preferred embodiment of my invention the spring 64 is preferably made with two leaves each of which is adjustable with regard to the other so that the tension of the spring 64 may be adjusted. This spring 64 is so arranged and disposed that it engages with the plunger 60. When the apparatus is in the position indicated by full lines this spring 64 presses against the plunger 60 and particularly the recess 61. When the hose is pulled as when the apparatus is in use, the pipe 52 and the parts fixedly connected therewith are drawn into the positions indicated by dotted lines in Fig. 1 and then the spring 62 is put under compression and the spring 64 gets behind the plunger 60 and acts as a pawl or stop to limit the movement of the plug 60 and rod 57 so that the pipe 52 is held positively, as indicated, and of course, the valve 15, is either closed or opened, to correspond. As this valve 15 opens against the water pressure the packing 14 remains firm on its seat when the valve is closed. Moreover, the valve 15 is located on the inflow side of the movable pipes or joints of the washer so that there is no tendency of these joints to leak when the apparatus is not in use and the pivotal mounting of the pipe 52 prevents all strains from coming on these joints at any time so that the washer is practically indestructible and has tight joints at all times.

From the foregoing, the operation of my improved washer will be readily understood. Assuming the parts to be as shown in the full lines in Fig. 1, the apparatus is used by exerting a pull on the hose which is transmitted to the coupling 54 and from this through the elbow 53 to the pipe 52 and the parts connected therewith. If this pull be exerted in a vertical direction the pipe 52 is brought to the position indicated by dotted lines and this causes the T 48 to turn and this turn rotates the crank-pipe 42 on its axis thereby shifting the arm 45, which causes the spindle 16 to raise and open the valve 15 and this permits water to pass through the pipe 10, the elbow 9, valve 15, valve stem 16 and thence out of the valve stem around the arm 45 through the T 31, disk 46 and thence through the pipe 47, T 48, pipe 52, elbow 53 and thence through the hose in the usual manner. The parts are so proportioned that the flow of the water will not be checked to any material extent by the valve 15 and various openings and passages. The pipe 52 being pivoted about a horizontal axis, it will follow the movements of the hose while the apparatus is in use as shown and described in my said application. When the operator wishes to shut off the flow of water he jerks the hose and releases the same thereby separating the plunger 60 and spring 64 and compressing the spring 62 which on expanding forces the plunger 60 by the spring 64 and restores the apparatus to the position shown in full lines in Fig. 1.

While I have shown and described one embodiment of my invention it is obvious that it is not restricted thereto but covers all structures whch come within the scope of the annexed claims.

What I claim is—

1. In a device of the class described, a distributing pipe, a valve mechanism connected with said pipe and controlled thereby so that the water may be turned on or cut off therefrom and means for positively holding said pipe in either position so that water may be cut off or flow therethrough.

2. In a device of the class described, a distributing pipe and means for mounting the same so that it has a rotary movement with regard to two axes at angles to each other, a valve mechanism connected with said pipe and controlled thereby so that when said pipe occupies one position, water is shut off from it and when in a second position water flows through it, and means for positively holding said pipe in either of said positions.

3. In a device of the class described, a top disk and means for holding the same, a pipe fixed in said disk, two disks rotatively mounted on said pipe and held in fixed relation by bolts and a distributing pipe supported by said disks and mounted below the same so as to move about an axis at an angle to the axis of the disks.

4. In a device of the class described, a top disk and means for fixedly holding the same, a pipe fixed in said disk, two disks rotatively mounted on said pipes and held in fixed relation by bolts, a delivery pipe connected with one of said disks and supported thereby so as to have a rotary movement on an axis at an angle to the axis of said disks and valve mechanism controlled by said distributing pipe and partially within the other pipe and so arranged and disposed as to cut off the water supply when the distributing pipe is in one position and to allow water to flow through said pipe when it is held in a second position.

5. In a device of the class described, a top disk and means for fixedly holding the same, a pipe fixed in said disk, two disks rotatively mounted on said pipe and held in fixed relation by bolts, a second pipe connected with the lowermost of said disks and mounted so as to have a rotary movement about an axis at an angle to the axis of said disks, a valve mechanism in said first mentioned pipe and controlled by said distributing pipe for shutting off and permitting the flow of water through said pipes and means for positively holding said distributing pipe in a position where a flow of water is permitted or where the flow of water is shut off.

6. In a device of the class described, a top disk and means for fixedly holding the same, a pipe fixed in said disk, two disks rotatively mounted on said pipe held in fixed relation by holding means, a distributing pipe connected with said disks by suitable connections which permit of a rotary movement of said distributing pipe in a vertical plane, a valve mechanism in said first mentioned pipe controlled by said distributing pipe and a valve at the upper extremity of said mechanism having a seat adjacent to said top disk whereby the water is shut off or turned on in accordance with the position of said distributing pipe and clear of all joints.

7. In a device of the class described, a distributing pipe and means for mounting the same so as to permit rotation about both a horizontal and a vertical axis and means for holding said pipe positively in either of two positions, said means including a rod with a plunger secured thereto, a pipe with a hollow plug therein at one end and through which said rod passes, a coiled spring between said plug and plunger, an opening in said pipe and a leaf spring passing through said pipe and secured thereto and adapted to engage said plunger and hold the same in either of the two positions, as desired.

8. In a device of the class described, a distributing pipe and means for supporting the same so that it may revolve about a vertical axis, said supporting means having joints with relatively movable parts, a pipe connected to the source of water supply and said supporting means, a valve connected to said pipe so that water may be turned off or on prior to reaching any joints with relatively moving parts in said supporting means, and mechanism carried by said distributing pipe for operating said valve.

9. In a device of the class described, a distributing pipe and means for mounting the same so that it may be moved about either of two axes at an angle to each other, and a valve mechanism in said mounting controlled by said distributing pipe and so arranged and disposed as to control the water supply before the water reaches a joint of said mounting which has a part turning on either of said axes.

IRVING J. SMITH.

Witnesses:
O. E. EDWARDS, Jr.,
GUSTAVE I. ARONOW.